US006148564A

United States Patent [19]

Dancasius

[11] Patent Number: 6,148,564

[45] Date of Patent: Nov. 21, 2000

[54] VEHICLE DOOR MODULE

[75] Inventor: Michael Dancasius, Wuppertal, Germany

[73] Assignee: Delphi Technologies, Inc., Troy, Minn.

[21] Appl. No.: 09/355,516

[22] PCT Filed: Jan. 23, 1998

[86] PCT No.: PCT/EP98/00359

§ 371 Date: Nov. 8, 1999

§ 102(e) Date: Nov. 8, 1999

[87] PCT Pub. No.: WO98/32621

PCT Pub. Date: Jul. 30, 1998

[51] Int. Cl.[7] .......... B60J 5/04

[52] U.S. Cl. .......... 49/502

[58] Field of Search .......... 49/502, 340, 344, 49/345; 296/146.5, 146.6

[56] References Cited

U.S. PATENT DOCUMENTS

| | | | |
|---|---|---|---|
| 1,876,589 | 9/1932 | Ball | 49/502 |
| 5,481,831 | 1/1996 | Heim et al. | 49/502 |
| 5,908,216 | 6/1999 | Townsend | 296/146.2 |
| 5,937,584 | 8/1999 | Salmonowicz et al. | 49/502 |

FOREIGN PATENT DOCUMENTS

| | | |
|---|---|---|
| 4212261 | 10/1993 | Germany . |

*Primary Examiner*—Jerry Redman
*Attorney, Agent, or Firm*—Patrick M. Griffin

[57] ABSTRACT

A module (16) for mounting in an aperture (14) in the inner panel (12) of a door (10) of a motor vehicle includes a structural member (18) having a central portion (20) and arms (22) extending away from the central portion in different directions. Each arm has a free end (26) secured to the inner panel such that the arms extend across the aperture when the structural member is mounted on the inner panel. A support panel (28) is secured to the structural member and at least one door component (34–40) is mounted on the support panel and/or the structural member.

6 Claims, 1 Drawing Sheet

10
36
16
38
34
40
22
30
26
12
24
14
32
20
18
28

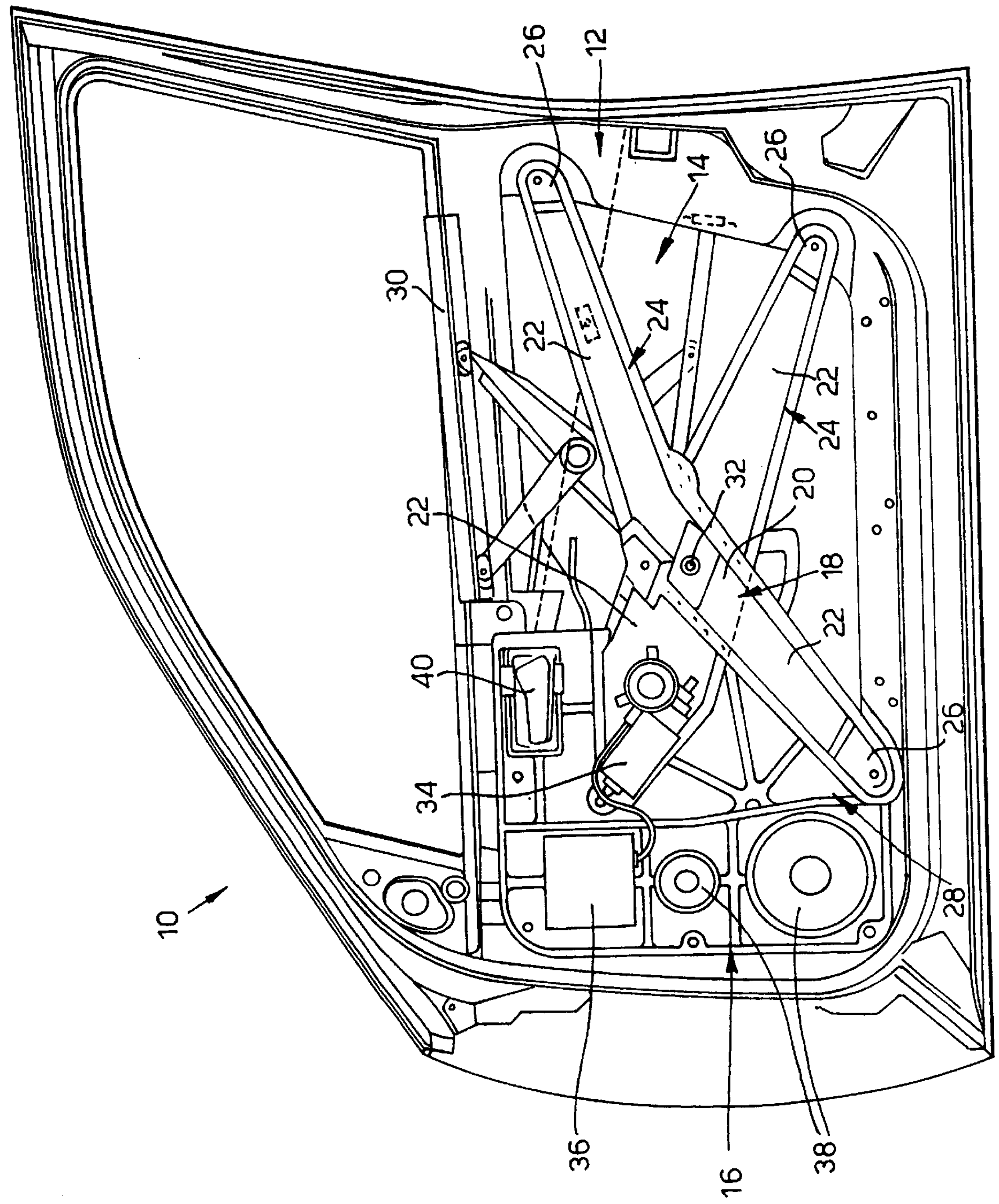
26
12
26
14
30
22
24
22
24
32
20
22
18
22
40
26
34
28
10
36
16
38

VEHICLE DOOR MODULE

TECHNICAL FIELD

This invention relates to a module for mounting on the inner panel of a door of a motor vehicle.

BACKGROUND OF THE INVENTION

It is known to mount components, such as a window lift mechanism, door lock handle, loudspeaker, etc. on the inner panel of a door of a motor vehicle. Assembly of such components on the inner panel requires the formation of holes in the inner panel and can be very time consuming.

SUMMARY OF THE INVENTION

It is an object of the present invention to provide an improvement to this known arrangement.

A module in accordance with the present invention for mounting in an aperture in the inner panel of a door of a motor vehicle comprises a structural member having a central portion and at least two arms extending away from the central portion in different directions, each arm having a free end securable to the inner panel such that the or at least two of the arms extend across the aperture when mounted on the inner panel; a support panel secured to the structural member; and at least one door component mounted on the support panel and/or the structural member.

With the present invention, the structural member provides rigidity and strength for the inner panel. Door components, such as a door latch and associated components, a loudspeaker, a window lift mechanism, etc. can be pre-assembled on the support panel and/or the structural member before the structural member is secured on the inner panel. This arrangement provides easier assembly of the door components on the door. By suitable selection of materials, the weight can be reduced without reducing the structural strength relative to the known arrangement described above.

BRIEF DESCRIPTION OF THE DRAWING

The present invention will now be described, by way of example, with reference to the accompanying drawing, in which the sole figure is a side view of a module in accordance with the present invention mounted in an aperture in the inner panel of a door of a motor vehicle.

DESCRIPTION OF THE PREFERRED EMBODIMENT

The FIGURE of the drawing shows a door 10 of a motor vehicle before the inner trim is fitted to the door. The door 10 comprises an inner panel 12 within which an aperture 14 has been formed. The module 16 in accordance with the present invention is mounted directly on the inner panel 12, as shown, or on a reinforcing member associated with the inner panel. The module 16 comprises a structural member 18 which is substantially X-shaped and which has a central portion 20 and four arms 22 extending away from the central portion. The structural member 18 is preferably formed from two members 24 which are joined or cross at their centres, each member being stamped from sheet steel or aluminium to have a substantially C-shaped cross-section. The free end 26 of each arm 22 is secured to the inner panel 12 such that the members 24 extend across the aperture 14, preferably substantially diagonally or diametrically. In an alternative arrangement, the structural member may be substantially T-shaped or Y-shaped and comprise three arms, at least two of which form a member 24 which extends across the aperture 14, preferably substantially diagonally or diametrically. In a further alternative arrangement, the structural member may comprise a single member 24 having two arms which extend away from the central portion in substantially opposed directions, and therefore extend across the aperture 14, preferably substantially diagonally or diametrically. In a still further alternative arrangement, the structural member may be formed from any other suitable metallic material (such as magnesium) or moulded from plastics material.

The module 16 further comprises a support panel 28 which is secured to the structural member 18 and to the inner panel 12. The support panel 28 can be formed in one-piece, or from several pieces which are joined together, and is preferably formed from plastics material. Where the structural member 18 is moulded from plastics material, the support panel 28 and the structural member may be moulded in one-piece. Various door components are mounted on the support panel 28 and the structural member 18. A window lift mechanism 30 is secured to the central portion 20 of the structural member 18 at the pivot point 32 of the window lift mechanism. An electric motor 34 for driving the window lift mechanism 30 is mounted on the support panel 28, or can be mounted on one of the arms 22 of the structural member 18. Control circuitry 36 for the electric motor 34, loudspeakers 38, and a door latch handle 40 are also mounted on the support panel 28. Other door components may be mounted on the support panel 28 and or the structural member 18.

The window lift mechanism 30 can be secured to the structural member 18 prior to the mounting of the structural member on the inner panel 12. The electric motor 34, control circuitry 36, loudspeakers 38, and door latch handle 40 can be pre-assembled on the support panel 28 prior to the mounting of the support panel on the inner panel 12 and the structural member 18. The support panel 28 can be secured to the structural member 18 either prior to, or after, the mounting of the structural member on the inner panel 12.

The module 16 can therefore be pre-assembled before mounting on the inner panel 12. The structural member 18 provides strength and rigidity for the inner panel 12.

What is claimed is:

1. A module (16) for mounting in an aperture (14) in the inner panel (12) of a door (10) of a motor vehicle, the module comprising a structural member (18) formed of two members (24), each of the two members (24) having a central portion (20) and two arms (22) extending away from the central portion in opposite directions, the two members (24) crossing each other at the central portion, each arm having a free end (26) securable to the inner panel such that the two arms of each of the two members (24) extend substantially diagonally across the aperture when mounted on the inner panel;

a support panel (28) secured to the structural member; and a window lift mechanism and at least one door component (34–40) mounted on the support panel and/or the structural member.

2. A module as claimed in claim 1 wherein the structural member (18) is formed from a metal selected from the group consisting of steel, aluminum and magnesium.

3. A module (16) for mounting in an aperture (14) in the inner panel (12) of a door (10) of a motor vehicle, the module comprising a structural member (18) formed from a metal selected from the group consisting of steel, aluminum and magnesium and formed of two members (24), each of the two members (24) having a central portion (20) and two arms (22) extending away from the central portion in opposite directions, the two members (24) crossing each other at the central portion, each arm (22) of the structural member having a substantially C-shaped cross-section and a free end (26) securable to the inner panel such that the two arms of each of the two members (24) extend substantially diagonally across the aperture when mounted on the inner panel;

a support panel (28) secured to the structural member; and a window lift mechanism and at least one door component (34–40) mounted on the support panel and/or the structural member.

4. A module as claimed in claim 3 wherein the support panel (28) is formed from one or more pieces and from plastics material.

5. A module as claimed in claim 1 or claim 3 wherein the at least one door component comprises an electric motor (34) for driving the window lift mechanism (30) and control means (36) for controlling the operation of the electric motor.

6. A module as claimed in claim 5, wherein the at least one door component further comprises a door latch handle (40), and/or a loudspeaker (38).

* * * * *